United States Patent [19]
Vitas et al.

[11] Patent Number: 4,524,950
[45] Date of Patent: Jun. 25, 1985

[54] OPEN CHANNEL GATE VALVE

[75] Inventors: John K. Vitas, Wilsonville; Harry J. Reed, Gladstone, both of Oreg.

[73] Assignee: Plasti-fab, Inc., Tualatin, Oreg.

[21] Appl. No.: 514,566

[22] Filed: Jul. 18, 1983

[51] Int. Cl.³ .................. F16K 3/12; F16K 3/312
[52] U.S. Cl. .................... 251/326; 251/328; 405/106
[58] Field of Search ............. 251/326, 328; 405/106, 405/104, 103; 138/94, 94.3

[56] References Cited

U.S. PATENT DOCUMENTS

| | | | |
|---|---|---|---|
| 1,167,851 | 1/1916 | Spiekerman | 405/104 |
| 2,683,354 | 7/1954 | Harza | 405/104 |
| 3,760,593 | 9/1973 | Whipps | 251/326 X |
| 4,223,868 | 9/1980 | Humes et al. | 251/326 |

FOREIGN PATENT DOCUMENTS

| | | | |
|---|---|---|---|
| 1957560 | 5/1971 | Fed. Rep. of Germany | 251/326 |
| 2063423 | 6/1981 | United Kingdom | 251/326 |

Primary Examiner—Arnold Rosenthal
Attorney, Agent, or Firm—Klarquist, Sparkman, Campbell, Leigh & Whinston

[57] ABSTRACT

An open channel gate valve in which the gate blade is slidably received in parallel grooves in a frame. The gate blade carries a sealing member of truncated V-shape, which engages a seat of truncated V-shape provided on the frame. Both the seat and sealing member are disposed in axially offset relation to the plane of the gate blade.

6 Claims, 4 Drawing Figures

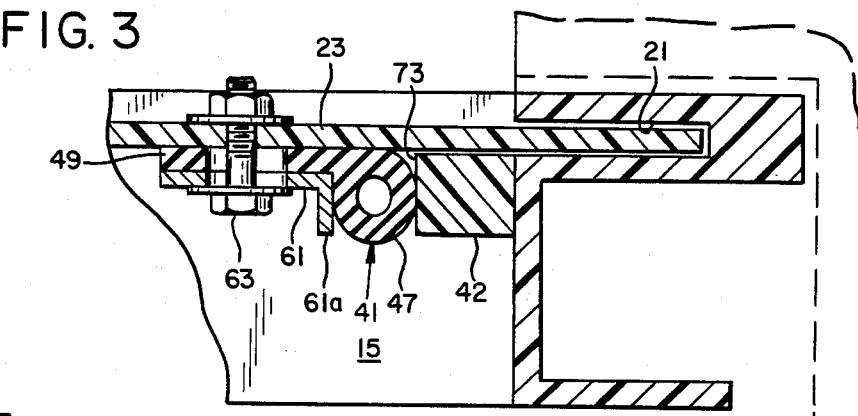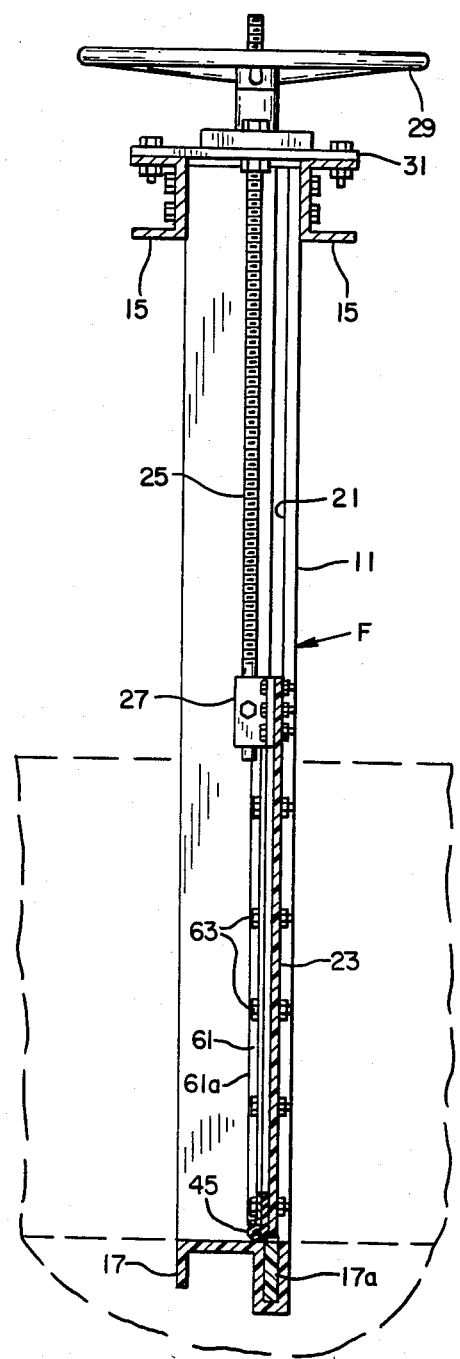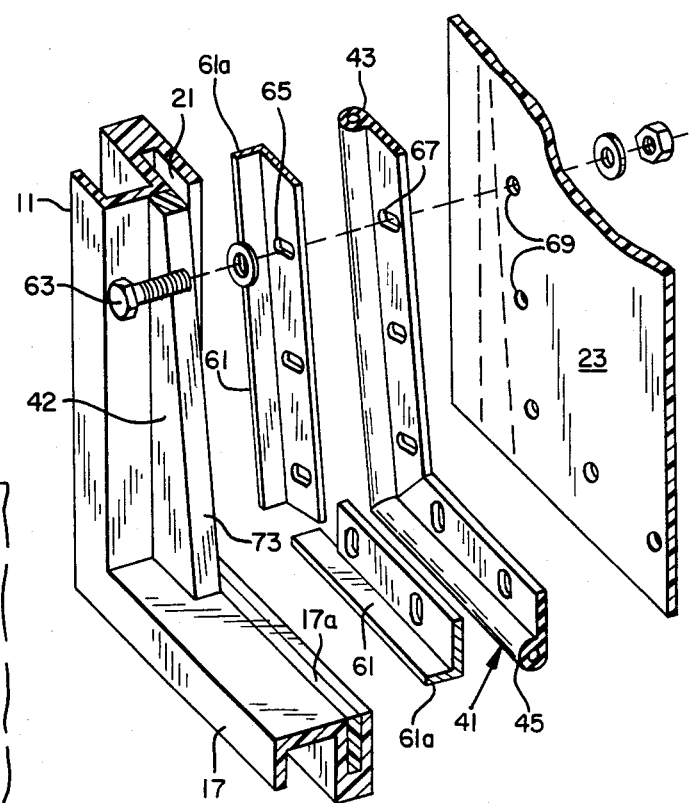

OPEN CHANNEL GATE VALVE

This invention relates to a valve for use in an open channel, and particularly a gate type open channel valve.

Some prior valves of this type have been provided with an elastomer seal to attain a tighter or better seal than attained with a plain gate. Plasti-Fab, Inc., of Tualatin, Oreg., has produced several versions of this kind of valve. In one form, the seal is mounted on the frame and engages the gate for its full travel. In another form, the seal is mounted on the gate, for full-travel seat contact.

Rodney Hunt Company manufactures a sluice gate called the "Glydaseal", purportedly under license from Ham Baker, Ltd., in which the gate has bonded to it a neoprene seal which faces in the direction of the flow axis. A mechanism, comprising a set of guide bars on the frame, engages and guides the movement of the gate and functions to wedge it against a PVC seat on the frame when the gate is closed. Adjustment of the tightness of the seal can be achieved by adjustment of the position of the guide bars toward and away from the seat.

Many prior low-leakage gate valves require machining operations, particularly on the seats. These operations are time-consuming and expensive.

SUMMARY OF THE INVENTION

The present invention provides an opening channel gate valve in which the frame is of open rectangular form, and may be fabricated from standard sections formed of fiber reinforced plastics, or of fiberglass reinforced plastics. Hereinafter the term "fiberglass" will be understood to mean reinforced plastics of the above type. The frame provides guide slots to receive and guide a rectangular gate blade. Mounted on the blade in offset relation to its plane is a truncated V-shaped elastomer seal which has its contact portions directed outwardly. Just before the gate reaches its fully closed position, the inclined upright legs of the seal engage inwardly facing, downwardly converging molded fiberglass seats provided on the interior faces of the frame uprights, while the horizontal leg of the seal engages the upper face of the bottom frame section.

The inclined elastomer seal legs are preferably mounted on the gate blade by bolts which pass through oversize or oblong holes in the seals, or if desired in the gate blade. This permits outward or inward adjustment of the positions of the inclined legs of the seal to vary the tightness of the seal, and downward adjustment of the bottom leg for better contact.

It is evident from the above that we have provided an open channel low-leakage gate valve which requires no machining operations, the formation of the fiberglass seats by the molding process providing contact surfaces entirely adequate for seat contact, without machine work. The low cost is also attributable to the capability of using standard fiberglass sections to provide an inexpensive fabricated open rectangular frame. Low cost is also aided by the fact that the seal is bolted in place, rather than being bonded in place, so that adjustment of the tightness of the seal can be effected by adjustment of the position of the legs of the seal, rather than having to provide a complicated and expensive mechanism for having to adjust the position of the gate blade itself.

In addition, our construction permits the use of a plain rectangular gate blade formed of plate material, either metal or fiberglass, rather than having to provide a gate blade of special form as would be the case with the Glydaseal valve.

In another form of the invention, seals are provided on both the frame and gate to seat against one another.

The subject matter which we regard as our invention is particularly pointed out and distinctly claimed in the concluding portion of this specification. The invention, however, both as to organization and method of operation, together with further advantages and objects thereof, may be best understood by reference to the following description, taken in connection with the following drawings, wherein like reference characters refer to like elements.

FIG. 2 is a cross section taken along lines 2—2 of FIG. 1;

FIG. 3 is a fragmentary section, on an enlarged scale, taken along lines 3—3 of FIG. 1;

FIG. 4 is an exploded view of a portion of the valve.

Figure 1:
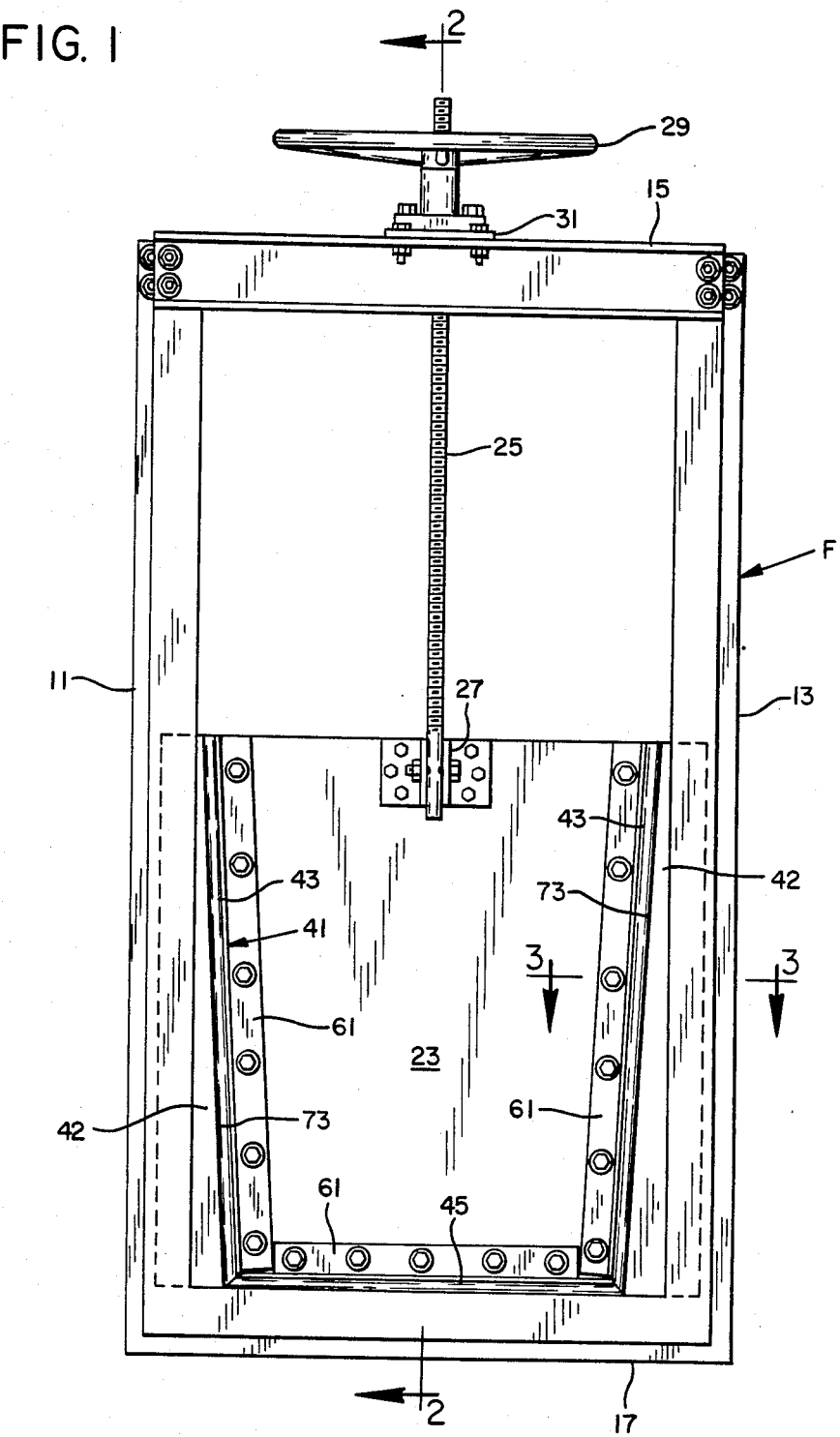
FIG. 1 is an elevational view of a valve embodying the concepts of the present invention.

Referring to the drawings, and particularly to FIG. 1, the valve includes an open rectangular fabricated frame F which includes upright sections 11 and 13, a pair of top sections 15, and a bottom section 17. While sections 11, 13 and 17 can be variously formed, as shown, they comprise fiberglass members, which are joined end to end. Top sections can comprise fiberglass channels.

Sections 11 and 13 are formed with opposing slots or grooves 21 which slidably receive the side margins of a rectangular gate blade 23 to guide its vertical travel.

As a matter of convenience, bottom section 17 may be made of a length of fiberglass of the same cross sectional shape as the vertical sections 11 and 13. If so, a filler strip 17a will be employed as shown in FIGS. 2 and 4, so that the bottom section presents a flat, ungrooved upper face.

The gate is moved by a threaded stem 25 which is connected at its lower end to the blade at 27 and has its upper end threadedly passing through a hand wheel 29. The latter is rotatably mounted on a cross plate 31, and is operable when turned one way, to pull the stem and the blade upwardly. When turned the opposite way, the hand wheel forces the blade downwardly.

The gate blade is provided on one of its faces with an elastomer seal 41 of truncated V-shape, to seat at its sides against inclined seats 42, and at the bottom, against the upper face of the bottom frame section 17. The seal is made up of two vertically inclined leg portions 43 and a horizontal base portion 45, joined end to end. In the particular valve disclosed, the seal is of modified J-shape (FIG. 3), having a bulbous head portion 47 joined integrally to a leg portion 49.

There is an attaching clamp strip 61 for each portion of the seal. Each strip clamps the associated portion against the blade by means of bolts 63 (FIGS. 3 and 4), which pass through holes 65 in the strips, 67 in the seal 43, and 69 in the blade 23. Note that the holes 67 provided in the seal are either oversize or laterally elongate to allow the leg portions 43 of the seal to be adjusted outwardly or inwardly to achieve a tighter fit.

The holes 65 in the side strips 61 may also have their holes 65 made laterally elongate so that the clamp strips and seal portions 43 may move together relative to the blade 23. This is particularly so, if the clamp strips are formed with a lip or flange 61a, as best shown in FIGS. 3 and 4, to back up the heads of the seals.

It is pointed out that the elastomeric nature of the seal 41 enables the base portion 45 to stretch to accommodate lateral adjustment of the vertical legs 43.

The holes in the bottom seal portion 45 and in the associated clamp strip 61 are vertically elongate to enable vertical adjustment of the bottom seal portion to achieve the desired degree of sealing engagement.

The seats 42 are preferably made of fiberglass and are mounted on the inner face of the vertical sections 11 and 13 of the frame. Each of the seats is formed or molded with a seating surface 73 (FIG. 3) for cooperative engagement with associated portions of the seal.

It is evident from the above that the seats 42 by means of the seating surfaces 73 provide first contacting surfaces facing generally inwardly toward one another, and that the inclined leg portions of the seal 41 provide second contacting surfaces facing outwardly for contact with the first contacting surfaces in a direction contained in a plane normal to the fluid flow path through the valve.

The seats 42 are formed so that the surfaces 73 are inclined to the vertical, as shown, to provide, with the upper face of the bottom frame section 17, a truncated V-shaped seating surface, which is complementary to the truncated V-shaped seal 41.

When the gate blade and its seal, which is offset from the plane of the blade, are lowered, no frictional resistance is encountered in regard to the seal, until after its inclined portions 43 come into contact with with the seat surfaces 73. Further downward movement of the blade compresses the head portions of the seal against the seat surfaces 73 with a sliding compressive engagement, and presses the base portion 45 against the upper surface of the bottom leg 17 of the frame in direct compressive contact.

By the above arrangement, a gate valve is provided for an open channel that effects a very good seal and yields very low leakage. All this is accomplished with a simple and inexpensive selection and arrangement of components which are so designed that they not only work effectively, but permit ready adjustment or replacement of the sealing contact as desired by the user.

By mounting the elastomer seals on the gate, and making the gate readily removable, the seals may be more readily replaced and repaired than in those valves where the seals are mounted on the guide frame. In the latter instance, it would be necessary to dewater the channel in order to perform maintenance work on the seals.

A modification of the FIG. 1-4 valve comprises providing elastomer seals both on the gate and the frame so that they would seat against each other. It is contemplated that seals of the same type as provided on the gate could be provided on the frame and mounted in a similar manner as described above.

With such a modified valve, a tighter seal could be obtained. It is true that maintenance of the seals on the frame would require draining of the channel, but the seats on the gate itself could be readily maintained without having to take that step.

What is claimed is:

1. An open channel gate valve comprising a gate blade and a frame,
    said gate blade being arranged normal to the fluid flow path through the valve,
    said frame being provided with a pair of parallel grooves to slidably receive parallel side margins of the gate blade, to guide the blade between open and closed positions,
    seat means including a pair of converging seats carried by the frame in offset relation to the plane of the gate blade,
    said seat means providing first contacting surfaces facing generally inwardly toward one another,
    sealing means carried by one face of the gate blade in offset relation to the plane of the gate blade, said sealing means having second contacting surfaces facing generally outwardly for contacting said first contacting surfaces in a direction contained in a plane normal to the fluid flow path as the blade moves to a closed position.

2. An open channel gate valve comprising a gate blade and a frame,
    the latter being provided with a pair of parallel grooves to slidably receive the side margins of the gate blade,
    seat means including a pair of converging seats carried by the frame in axially offset relation to the plane of the gate blade,
    sealing means carried by one face of the gate blade in offset relation to the plane of the gate blade for engaging said inclined seats as the blade moves to a closed position, the sealing means being of truncated V-shape, while the gate blade is of rectangular shape.

3. A gate valve as recited in claim 1 in which the sealing means is adjustably mounted on the blade for lateral adjustment.

4. A gate valve as recited in claim 1 in which the sealing means includes a base portion arranged to engage the frame in the closed position of the valve.

5. A gate valve as recited in claim 1 in which the sealing means is detachably mounted on the gate blade.

6. An open channel gate valve comprising a gate blade and a frame,
    the latter being provided with a pair of parallel grooves to slidably receive the side margins of the gate blade,
    seat means including a pair of converging seats carried by the frame in axially offset relation to the plane of the gate blade,
    sealing means carried by one face of the gate blade in offset relation to the plane of the gate blade for engaging said inclined seats as the blade moves to a closed position, both the seat means and the sealing means being of truncated V-shape.

* * * * *